(12) United States Patent
Parsons et al.

(10) Patent No.: US 12,508,342 B2
(45) Date of Patent: Dec. 30, 2025

(54) DEBRIDEMENT COMPOSITION

(71) Applicant: ConvaTec Limited, Flintshire (GB)

(72) Inventors: David Parsons, Flintshire (GB);
Genevieve E. Harris, Flintshire (GB);
Hollie J. Hathaway, Flintshire (GB)

(73) Assignee: CONVATEC LIMITED, Flintshire (GB)

( * ) Notice: Subject to any disclaimer, the term of this patent is extended or adjusted under 35 U.S.C. 154(b) by 1149 days.

(21) Appl. No.: 17/206,822

(22) Filed: Mar. 19, 2021

(65) Prior Publication Data

US 2021/0290815 A1 Sep. 23, 2021

Related U.S. Application Data

(63) Continuation of application No. PCT/GB2021/050683, filed on Mar. 19, 2021.

(30) Foreign Application Priority Data

Mar. 20, 2020 (GB) .................................. 2004055

(51) Int. Cl.
| | | |
|---|---|---|
| *A61L 15/42* | (2006.01) | |
| *A61L 15/20* | (2006.01) | |
| *A61L 15/28* | (2006.01) | |
| *A61L 15/48* | (2006.01) | |

(52) U.S. Cl.
CPC .............. *A61L 15/42* (2013.01); *A61L 15/20* (2013.01); *A61L 15/28* (2013.01); *A61L 15/48* (2013.01); *A61L 2300/208* (2013.01); *A61L 2300/21* (2013.01); *A61L 2300/216* (2013.01); *A61L 2300/802* (2013.01); *A61L 2420/06* (2013.01)

(58) Field of Classification Search
CPC .......... A61L 15/42; A61L 15/20; A61L 15/48
See application file for complete search history.

(56) References Cited

U.S. PATENT DOCUMENTS

| | | | | |
|---|---|---|---|---|
| 6,106,854 | A * | 8/2000 | Belfer ..................... | A01N 59/12 424/722 |
| 2002/0169405 | A1 | 11/2002 | Roberts | |
| 2011/0082105 | A1 | 4/2011 | Fevola et al. | |
| 2011/0118363 | A1 * | 5/2011 | Jensen .................... | A61L 15/34 523/111 |
| 2012/0039820 | A1 * | 2/2012 | Axe ....................... | A61Q 11/00 424/641 |
| 2012/0122755 | A1 | 5/2012 | Sasa et al. | |
| 2013/0150451 | A1 * | 6/2013 | Salamone ............... | A61P 43/00 514/635 |
| 2014/0227483 | A1 | 8/2014 | Eaves, III | |
| 2017/0151314 | A1 | 6/2017 | Salamone et al. | |
| 2017/0347661 | A1 | 12/2017 | Parsons | |
| 2019/0099300 | A1 | 4/2019 | Ogawa et al. | |

FOREIGN PATENT DOCUMENTS

| | | |
|---|---|---|
| CN | 102525832 A | 7/2012 |
| CN | 110559312 A | 12/2019 |
| EP | 3250244 B1 | 9/2021 |
| GB | 2531344 A | 12/2014 |
| GB | 2527617 A | 12/2015 |
| JP | 2007505124 A | 3/2007 |
| JP | 2011515136 A | 5/2011 |
| JP | 2015500794 A | 1/2015 |
| JP | 2016160264 A | 9/2016 |
| WO | 2008133724 A2 | 11/2008 |
| WO | 2017170956 A1 | 2/2019 |
| WO | 2019227034 A1 | 11/2019 |

OTHER PUBLICATIONS

International Search Report; European Patent Office; International Application No. PCT/GB2021/050683; Jun. 17, 2021; 3 pages.
Written Opinion of the International Searching Authority; European Patent Office; International Application No. PCT/GB2021/050683; Jun. 17, 2021; 6 pages.

* cited by examiner

*Primary Examiner* — Andrew S Rosenthal

(74) *Attorney, Agent, or Firm* — TAFT STETTINIUS HOLLISTER LLP; Ryan O. White; Derek B. Lavender

(57) ABSTRACT

The disclosed technology relates to a wound dressing comprising an absorbent layer impregnated or coated with a composition comprising a chelating agent, an amphoteric surfactant, and an anionic surfactant. The invention further relates to methods and uses of the wound dressing.

20 Claims, No Drawings

DEBRIDEMENT COMPOSITION

This application is a continuation of International Application No. PCT/GB2021/050683 filed Mar. 19, 2021 and claims the priority of foreign Application Nos. GB2004055.6, filed Mar. 20, 2020. The disclosures of which are hereby incorporated herein in their entirety.

TECHNICAL FIELD

The present disclosure relates to the field of wound care and relates, in particular to a composition, wound dressing or other debridement formulation or aide to promote and enhance the natural cleansing mechanism of autolytic debridement.

BACKGROUND OF THE DISCLOSURE

The physiology of skin makes it a remarkably resilient organ. The outer layer (the stratum corneum) consists of scales formed from dead epithelial cells that have become flattened and compressed with skin oils (sebum). The stratum corneum provides a flexible and effectively waterproof barrier. It is elastic and resilient, but, because it is simply compressed layers, it can be eroded by repetitive frictional forces, or by the action of chemicals or breached by trauma to create a wound. Once the outer protective layer is removed the nerve endings become exposed leading to pain. The loss of the barrier leads to fluid leakage (exudation) and the underlying tissue is vulnerable to microbial invasion.

Clean and acute wounds normally heal spontaneously with the aid of simple supportive physical measures such as a protective dressing. Autolytic (spontaneous, biochemically-mediated) debridement of non-viable tissue is part of the process of natural acute wound healing. However, the treatment of contaminated-traumatic, necrotic and chronic wounds can be more challenging and autolytic debridement may be inadequate. Often, removal of contaminated and non-viable tissues is required before normal healing can be re-established. A well-qualified medical professional may be able to perform mechanical and/or sharp debridement to remove this non-viable matter, but nurses and less well qualified carers may not be as competent in performing such tasks or lack confidence. Under these circumstances less invasive debridement techniques are required. It is well understood that wound irrigation between dressing changes can help mechanically remove some matter and that autolytic debridement can be encouraged by use of moisture donating products and/or moisture retentive dressings. However, autolytic debridement can be a slow process and a wound containing non-viable tissue is highly susceptible to microbial proliferation and infection. Therefore, enhancement or acceleration of autolytic debridement is desirable. The types of non-viable tissue may include necrotic (dead) tissues, slough (accumulating granulation and epithelial cells that are not surviving in the chronic wound environment) and biofilm (microbial matter including viable microorganisms and associated self-produced mucilage or extracellular polymeric substance (EPS)). Biofilm is viable microbial tissue that can re-establish and multiply rapidly, returning to its original condition within a few days or even a few hours. Slough is a consequence of the inflammatory phase of wound healing and it comprises dead or redundant white blood cells, fibrin/fibroblasts, cellular debris/components of healing, and liquified devitalised tissue. Slough can provide a source of nutrients for bacterial cells and a suitable environment for their proliferation, subsequently enabling biofilm formation. Necrotic tissue is an additional source of cellular debris in the form of fibrous proteins (such as collagen) and proteoglycans (components of the extracellular matrix). As a result, failure to adequately prepare the wound bed via removal of detrimental waste material such as slough and necrotic tissue has been shown to impede healing. Commonly associated with chronic wounds, the accumulation of such tissue alongside the poorly regulated proliferation of microorganisms and subsequent biofilm formation are believed to be important factors in the failure of some wounds to heal.

There is therefore a need for a composition capable of enhancing autolytic debridement. Such compositions may control biofilm before infection can occur. In a wound dressing, it would be desirable to have a composition that allows for loosening, softening and disrupting the non-viable material which further enhances the ability of absorbent materials to mechanically remove such material from the wound bed which is believed to then thus facilitate healing.

The use of surface-active agents (surfactants) may seem an obvious choice to aid in the removal of undesirable matter, but they can also be potentially detrimental (cytotoxic-causing the death of cells involved in healing locally or systemically toxic) and due consideration needs to be given to compatibility with other treatments being used simultaneously. Anti-biofilm agents must also be given similar consideration as must the tonicity and pH of the wound environment. Therefore, formulating for enhanced autolytic debridement is complex and requires more than an adaptive or additive approach. Barrier function, normal tonicity and pH need to be restored if pain and delays to healing are to be minimised.

Where active debridement by biological (maggots or enzymes), sharp surgical or other mechanical debridement techniques cannot be applied, the current practice known in the art is to encourage autolytic debridement. This is believed to be achieved by the use of occlusive and/or moist wound dressings with brief wound irrigation at dressing change to remove unwanted matter from the wound environment by liquid flow.

Wound cleansing compositions are disclosed in for example U.S. Pat. No. 5,284,833. This discloses a physiologically compatible aqueous wound cleanser composition which passes both Draize eye irritation test and primary dermal irritation test, said composition comprising, on a weight percent basis: from about 0.01 to about 50 percent of a surfactant to give said composition a surface tension of below about 30 dynes/cm; from about 0.05 to about 10 percent of an osmotic adjuster to give said composition an osmolality of from about 200 to about 320 mOs/liter; from about 0.05 percent to about 3 percent of a buffering agent to maintain a pH in a range of from about 6 to about 7.7 in said composition; and a sufficient amount of water necessary to establish the foregoing properties. Although safety is duly considered, U.S. Pat. No. 5,284,833 does not address the challenge of biofilm or the transient nature of irrigation products.

US2017347661 (A1) describes a composition comprising antimicrobial metal ions and a quaternary cationic surfactant. The composition disrupts the biofilm EPS thereby increasing the efficacy of the antiseptic action of the metal ion and reducing the risk of infection. There is no reference to the disruption or removal of non-biofilm tissue.

SUMMARY OF INVENTION

There is a need for the products aimed at enhancing wound debridement with minimal intervention that can be used in any setting. In some instances, where suitable medical supervision is available, it would be beneficial to have a composition and dressing that is antimicrobial. However, in other instances, an antimicrobial may not be required because debridement and a wound cleaning can minimise or prevent biofilm formation.

The disclosed technology in one embodiment relates to a composition comprising a chelating agent, an amphoteric surfactant and an anionic surfactant.

In one embodiment the composition further comprises a nonionic surfactant.

The composition may be impregnated or coated into or placed onto a device that is placed in direct contact with a wound. The device may include a wound dressing or a debridement tool. The wound dressing and debridement tool may both have an absorbent layer.

The debridement tool may have an absorbent layer and it may be a natural or synthetic material and in the form of a liquid or solid foam or mousse, a fabric, a technical textile or brush.

The composition may for instance be in form of a mousse or a foam that can be generated in-situ after being applied as a liquid. Without being bound by theory, the mousse or foam could stay in place in the wound and act as a wound dressing formed in-situ. Alternatively, the composition could be pre-formed and removed during or after the debriding process; a traditional foam product; a fabric wipe that is woven to produce a looped fibre surface; a nonwoven or calendered fabric such as a pad, a wipe or a pan scrub; a brush like fabric or tool where the fibres are either cut to give a flock-like finish or for example are monofilament.

Materials known to prepare foams, fabrics, textiles and brushes are known in the art.

The disclosed technology in one embodiment relates to a debridement tool disclosed herein. A debridement tool may typically be used for mechanical debridement.

The debridement tool may form instance be a sponge or pad. A common material used to prepare a sponge or pad is a foam, typically a polyurethane foam, polypropylene foam, polyester foam or polyvinyl alcohol (PVA) foam. A polyester foam may be useful for a wipe.

The disclosed technology in one embodiment relates to a wound dressing disclosed herein. A wound dressing may typically debride by autolysis.

In one embodiment the disclosed technology relates to a wound dressing comprising an absorbent layer impregnated or coated with a composition comprising a chelating agent, an amphoteric surfactant, and an anionic surfactant. The absorbent layer may be in direct contact with the wound, or absorbent layer may have a wound contact layer between the absorbent and a wound. In one embodiment the absorbent layer is in direct contact with the wound.

In one embodiment the disclosed technology wound dressing comprising an absorbent layer impregnated or coated with a composition comprising a chelating agent, an amphoteric surfactant, an anionic surfactant, and a nonionic surfactant.

As used herein the term "hydrocarbyl" includes a group such as alkyl, aryl, aralkyl, alkaryl, cycloalkyl or alkenyl, which may be linear or branched, and/or saturated or unsaturated, or may be ester derivatives thereof. In one embodiment the hydrocarbyl may include which a linear or branched an alkyl or alkenyl group, typically an alkyl group.

The amount of composition ingredients is presented on a wt % basis, as well as on an area density (weight per area) basis dependent on the form and application of the product. For example, % w/w may be most appropriate for a fluid product such as a liquid, gel or mousse, whereas an area density may be more appropriate to a flat sheet dressing. In the examples a 150 $gm^{-2}$ fabric is used therefore the area density basis is calculated by multiplying the wt % by a factor of 1.5.

Anionic Surfactant

The disclosed technology defines an anionic surfactant. In different embodiments the anionic surfactant may be present at 0.05 to 1.5 wt %, or 0.1 to 1 wt %, or 0.1 to 0.5 wt %.

On an area density the amount of anionic surfactant may be 0.075 to 2.25 $gm^{-2}$, or 0.15 to 1.5 $gm^{-2}$, or 0.15 to 0.75 $gm^{-2}$.

The anionic surfactant may include all forms of lipophilic oligomeric hydrocarbon and/or polyethoxylate with a negatively charged hydrophilic head group such as carboxylate, sulphate, sulphonate, sulphonated ester, sulphated ester, sulphated amide, carboxylated amide or phosphate anionic head group. For example, include a fatty acid or fatty acid salt, a glutamate, a sulphosuccinate, a sarcosine, a sarcosinate, an isethionate, and a taurate.

The anionic surfactant may be a salt, or an hydrocarbyl, or hydrocarbyl ester derivatives thereof, wherein the hydrocarbyl group contains 6 to 24, or 8 to 24 or 10 to 20 carbon atoms, typically in the form of a salt.

In one embodiment the anionic surfactant may include a sulphosuccinate, a sarcosine, a glutamate.

An example of a sarcosine is sodium lauroyl sarcosinate.

For example, a sulphosuccinate may include di-sodium lauryl sulphosuccinate.

An example of a glutamate is sodium cocoyl glutamate.

In one embodiment the anionic surfactant comprises a fatty acid or fatty acid salt.

The fatty acid or fatty acid salt may be a C8-24 fatty acid or fatty acid salt or a mixture thereof. The salt may be comprised of the fatty acid and an alkali metal or alkaline earth metal, typically the alkali metal. The alkali metal may for instance include sodium or potassium, typically sodium.

The fatty acid of the C8-20 may have 10 to 20, or 12 to 18 carbon atoms.

The fatty acid or fatty acid salt may be saturated or unsaturated. When unsaturated the unsaturation may be mono- or di-unsaturation i.e., the fatty acid is a mono- or di-unsaturated fatty acid.

The unsaturated fatty acid may contain a cis- or trans-double bond.

In one embodiment the fatty acid or fatty acid salt is a fatty acid having 12-18 carbon atoms, mono-unsaturated and is classified as a monosaturated fatty acid.

Examples of fatty acids include stearic, ricinoleic, oleic, eladic, petrolselinic, palmitic, erucic, behenic, lauric, myristic, or linoleic (such as 9,11-linoleic or 9,12-linoleic) acid.

In one embodiment the fatty acid may be chosen from oleic acid, elaidic acid or petrolselinic acid.

In one embodiment the fatty acid may be chosen from oleic acid, or elaidic, typically oleic acid.

The fatty acid may be a di-unsaturated fatty acid such as 9,12 linoleic acid, and the salt is sodium linoleate.

Amphoteric Surfactant

In one embodiment the amphoteric surfactant is present at 0.01 to 1.5 wt %, or 0.02 to 0.8 wt %, or 0.05 to 0.5 wt %.

On an area density the amount of amphoteric surfactant may be 0.015 to 2.25 $gm^{-2}$, or 0.03 to 1.2 $gm^{-2}$, or 0.075 to 0.75 $gm^{-2}$.

In one embodiment the amphoteric surfactant is present at or 0.05 to 0.4 wt % (or 0.075 to 0.6 $gm^{-2}$).

The amphoteric surfactant may include an hydrocarbyl-amphoacetate, alkenyl-amphoacetate, hydrocarbyl-amphodiacetate, alkenyl-amphodiacetate, hydrocarbylampho-propionate, hydrocarbylampho-dipropionate, or hydrocarbylamphohydroxypropyl sultaine, wherein the hydrocarbyl and alkenyl groups contain 6 to 24, or 8 to 24, or 10 to 20 carbon atoms. Typically, the amphoteric surfactant has a counter-ion of an alkali metal such as sodium or an ammonium.

Specific examples of an amphoteric surfactant include sodium cocoamphoacetate, or cocoamidopropyl betaine, lauryl betaine, and hydroxysultaine. In one embodiment the amphoteric surfactant may be sodium cocoamphoacetate.

Chelating Agent

The disclosed technology herein comprises a chelating as defined herein. The chelating agent may be in the form of a salt comprising negatively charged and positively charged ions. Positively charged ion(s) may include an ammonium, or Group I of the periodic table alkali metal, for example sodium or potassium.

In different embodiments the chelating agent may present at 0.01 to 1 wt %, or 0.1 to 0.75 wt %, or 0.1 to 0.5 wt %.

On an area density the amount of chelating may be 0.015 to 1.5 $gm^{-2}$, or 0.15 to 1.125 $gm^{-2}$, or 0.15 to 0.75 $gm^{-2}$.

The wound dressing disclosed herein may be impregnated or coated with the chelating agent, and the chelating agent may comprise a hydroxy-carboxylic acid ester or amide, acid, or salts thereof for agents including (for example a citrate or citric acid, tartrate or tartaric acid, tartramide, or tartrimide, a lactate or lactic acid, maleate or maleic acid, glycolate or glycolic acid, oxalate or oxalic acid, gluconate or gluconic acid, a phosphate such as an orthophosphate, a polyphosphate, a pyrophosphate, or a salt of an aminopolycarboxylic acid such as ethylenediaminetetra-acetic acid (EDTA), 1,2-bis(o-aminophenoxy) ethane-N,N,N',N'-tetraacetic acid (BAPTA), ethylene glycol-bis(β-aminoethyl ether)-N,N,N',N'-tetraacetic acid (EGTA), nitrilotriacetic acid (NTA), fura-2, indo-1, pentetic acid or sodium poly (aspartate), haemoglobin, chlorophyll or porphyrin. An amine such as aminoethylethanolamine, diethylenetriamine, ethylenediamine, triethylenetetramine, tetramethylethylenediamine, cyclen or deferoxamine.

In one specific embodiment the chelating agent may be a salt of EDTA.

The chelating agent may in one specific embodiment be EDTA, and EDTA is a mixture of di-, tri- or tetra-basic salts of EDTA. The EDTA salt may for instance be di-sodium salt of EDTA, or calcium di-sodium salt of EDTA, or tetra-sodium salt of EDTA. In one embodiment the salt of EDTA may be a mixture of salts of EDTA. Without being bound by theory it is believed that EDTA when present may be in the form of di- or tri- or tetra-basic salt, and the specific form of the salt will depend on the pH of a wound site.

In one embodiment EDTA may be added to the composition as tetra-sodium EDTA.

In one embodiment the chelate comprises an oxalate.

In one embodiment the chelate comprises a hydroxycarboxylic acid ester, salt, or amide thereof. When the chelating agent comprises a hydroxycarboxylic acid salt, the salt may be a citrate salt for example mono- or di- or tri-potassium citrate, or mono- or di- or tri-sodium citrate.

In one embodiment the chelating agent comprises a hydroxycarboxylic acid salt, and the salt may be mono- or di- or tri-sodium citrate, typically tri-sodium citrate.

In one embodiment the chelate comprises a phosphate. The phosphate may be an ortho-phosphate, a pyrophosphate, a tripolyphosphate or a derivatised phosphate. The phosphate is typically in the form or a potassium or sodium salt. Examples of the phosphate include potassium phosphate dibasic, potassium pyrophosphate, tri-sodium ascorbate phosphate, and sodium tripolyphosphate. An example of a derivatised phosphate being sodium ascorbyl phosphate.

In one embodiment the composition may be impregnated or coated in the wound dressing or debridement tool may comprise of:
 the chelating agent is present at 0.01 to 1 wt % (or 0.015 to 1.5 $gm^{-2}$),
 the anionic surfactant is present at 0.05 to 1.5 wt % (or 0.075 to 2.25 $gm^{-2}$)), and
 the amphoteric surfactant is present at 0.01 to 1.5 wt % (or 0.015 to 2.25 $gm^{-2}$).

In one embodiment the composition may be impregnated or coated in the wound dressing or debridement tool may comprise of:
 the chelating agent is present at 0.1 to 0.75 wt % (or 0.15 to 1.125 $gm^{-2}$),
 the anionic surfactant is present at or 0.1 to 1 wt % (or 0.15 to 1.5 $gm^{-2}$), and
 the amphoteric surfactant is present at or 0.02 to 0.8 wt % (or 0.03 to 1.2 $gm^{-2}$).

In one embodiment the composition may be impregnated or coated in the wound dressing or debridement tool may comprise of:
 the chelating agent is present at 0.1 to 0.5 wt % (or 0.15 to 0.75 $gm^{-2}$),
 the anionic surfactant is present at or 0.1 to 0.5 wt % (0.15 to 0.75 $gm^{-2}$), and
 the amphoteric surfactant is present at or 0.05 to 0.5 wt % (or 0.075 to 0.75 $gm^{-2}$).

In one embodiment the composition may be impregnated or coated in the wound dressing or debridement tool comprises:
 the chelating agent is present at 0.1 to 0.5 wt % (or 0.15 to 1.5 $gm^{-2}$),
 the anionic surfactant is present at 0.1 to 0.5 wt % (or 0.15 to 1.5 $gm^{-2}$), and
 the amphoteric surfactant is present at or 0.05 to 0.4 wt % (or 0.075 to 0.6 $gm^{-2}$).

In one embodiment the composition may be impregnated composition may be impregnated or coated in the wound dressing or debridement tool disclosed herein above may comprise:
 the amphoteric surfactant may be chosen from an hydrocarbyl-amphoacetate, alkenyl-amphoacetate, hydrocarbyl-amphoacetate, alkenyl-amphoacetate, hydrocarbylampho-propionate, hydrocarbylampho-dipropionate, or hydrocarbylamphohydroxypropyl sultaine, wherein the hydrocarbyl groups contain 6 to 24, or 8 to 24 carbon atoms;
 the anionic surfactant may be chosen from a fatty acid or fatty acid salt, sodium hydrocarbyl sulphates, hydrocarbyl ammonium sulphates, hydrocarbyl sulphosuccinates, hydrocarbyl sarcosines, hydrocarbyl sarcosinates, an hydrocarbyl isethionate, and hydrocarbyl taurates; and
 the chelating agent may be chosen from a hydroxycarboxylic acid ester or amide, acid, or salts thereof for agents including (for example a citrate, tartrate, tartramide, or tartrimide, a lactate, lactic acid, or glycolic acid, or glycolate), an oxalate, gluconic acid, a gluconate, a phosphate, or a salt of ethylenediaminetetraacetic acid (EDTA).

In one embodiment the composition may be impregnated or coated in the wound dressing or debridement tool disclosed herein above may comprise:

the amphoteric surfactant may be chosen from an hydrocarbyl-amphoacetate, alkenyl-amphoacetate, hydrocarbyl-amphodiacetate, alkenyl-amphodiacetate, hydrocarbylampho-propionate, hydrocarbylamphodipropionate, or hydrocarbylamphohydroxypropyl sultaine, wherein the hydrocarbyl groups contain 6 to 24, or 8 to 24 carbon atoms;

the anionic surfactant may be chosen from a fatty acid or fatty acid salt, a sulphosuccinate, a sarcosine, or a sarcosinate; and the chelating agent may be chosen from an oxalate, a phosphate, a citrate, or a salt of EDTA.

In one embodiment the composition may be impregnated or coated in the wound dressing or debridement tool may comprise of:

the chelating agent is a salt of EDTA and is present at 0.01 to 1 wt % (or 0.015 to 1.5 $gm^{-2}$), the anionic surfactant is present at 0.05 to 1.5 wt % (0.075 to 2.25 $gm^{-2}$), and the amphoteric surfactant is present at 0.01 to 1.5 wt % (or 0.015 to 2.25 $gm^{-2}$).

In one embodiment the composition may be impregnated or coated in the wound dressing or debridement tool may comprise of:

the chelating agent is a salt of EDTA and is present at 0.1 to 0.75 wt % (or 0.15 to 1.125 $gm^{-2}$), the anionic surfactant is present at or 0.1 to 1 wt % (0.15 to 1.5 $gm^{-2}$), and the amphoteric surfactant is present at or 0.02 to 0.8 wt % (0.03 to 1.2 $gm^{-2}$).

In one embodiment the composition may be impregnated or coated in the wound dressing or debridement tool may comprise of:

the chelating agent is a salt of EDTA and is present at 0.1 to 0.5 wt % (or 0.15 to 0.75 $gm^{-2}$), the anionic surfactant is present at or 0.1 to 0.5 wt % (or 0.15 to 0.75 $gm^{-2}$), the amphoteric surfactant is present at or 0.05 to 0.5 wt % (or 0.075 to 0.75 $gm^{-2}$).

In one embodiment the composition may be impregnated or coated in the wound dressing or debridement tool may comprise of:

the chelating agent is a salt of EDTA and is present at 0.01 to 1 wt % 0.015 to 1.5 $gm^{-2}$), the anionic surfactant is a fatty acid or fatty acid salt and is present at 0.2 to 1 wt %, the amphoteric surfactant is present at 0.01 to 1.5 wt % (or 0.015 to 2.25 $gm^{-2}$).

In one embodiment the composition may be impregnated or coated in the wound dressing or debridement tool may comprise of:

the chelating agent is a salt of EDTA and is present at 0.1 to 0.75 wt % (or 0.15 to 1.125 $gm^{-2}$), the anionic surfactant is a fatty acid or fatty acid salt and is present at or 0.25 to 0.7 wt %, and the amphoteric surfactant is present at or 0.02 to 0.8 wt % (or 0.03 to 1.2 $gm^{-2}$).

In one embodiment the composition may be impregnated or coated in the wound dressing or debridement tool may comprise of:

the chelating agent is a salt of EDTA and is present at 0.1 to 0.5 wt % (or 0.15 to 0.75 $gm^{-2}$)

the anionic surfactant is a fatty acid or fatty acid salt and is present at or 0.1 to 0.5 wt % (or 0.15 to 0.75 $gm^{-2}$), the amphoteric surfactant is present at or 0.05 to 0.5 wt % (or 0.075 to 0.75 $gm^{-2}$).

In one embodiment the composition may be impregnated or coated in the wound dressing or debridement tool may further comprise a nonionic surfactant. The nonionic surfactant may provide addition stability for the composition may be impregnated or coated in the wound dressing absorbent layer or debridement tool.

When present the nonionic surfactant may be present at 0.01 to 0.7 wt %, or 0.05 to 0.5 wt %, or 0.1 to 0.3 wt %.

On an area density the amount of nonionic surfactant may be 0.015 to 1.05 $gm^{-2}$, or 0.075 to 0.75 $gm^{-2}$, or 0.15 to 0.45 $gm^{-2}$.

In one embodiment the composition may be impregnated or coated in the wound dressing or debridement tool may further comprise a nonionic surfactant and the composition disclosed herein may contain:

the chelating agent is present at 0.01 to 1 wt % (or 0.015 to 1.5 $gm^{-2}$), the anionic surfactant is present at 0.05 to 1.5 wt % (or 0.075 to 2.25 $gm^{-2}$), the amphoteric surfactant is present at 0.01 to 1.5 wt % (or 0.015 to 2.25 $gm^{-2}$), and the nonionic surfactant may be present at 0.01 to 0.7 wt % (or 0.015 to 1.05 $gm^{-2}$).

The nonionic surfactant may include esters of fatty acids, fatty acid amides, fatty acid ethoxylates, fatty acid amide ethoxylates, polyethoxylated compounds and polyalkyl ethers, polyhydroxyl compounds, hydrocarbyl glucosides and amine oxides. For example, polyoxyethylene fatty acid esters (polyoxyethylene sorbitan fatty acid ester), polyoxyethylene glycol fatty acid esters (polyoxyethylene glycol fatty acid ester), sucrose fatty acid esters (sucrose fatty acid ester), polyoxyethylene hydrogen carbonate castor oils and polyoxyethylene alkyl ethers (polyoxyethylene hydrogenated castor oil) ether (polyoxyethylene alkyl ether).

The nonionic surfactant may include polysorbate 20, polysorbate 40, polysorbate 60, polysorbate 80, PEG-40 stearate, PEG-100 stearate, sucrose stearate, sucrose myristate, isopropyl myristate, sucrose oleate, sucrose palmitate, sucrose laurate, laureth-21 (laureth field 21), ceteth-15 (ceteth field 15), steareth-20 (steareth field 20), oleth-15 (oleth field 15), beheneth-20 and ceteareth-20 (beheneth field 20).

In one embodiment the nonionic surfactant may be a polysorbate, typically polysorbate 20.

The wound dressing disclosed herein may comprise at least one layer composed of a foam, fabric or technical textile. For example, the textile may be a nonwoven or woven fibrous layer, or a gel-forming fibre, or gauze.

Gauze may be made from a cellulose such as cotton or viscose.

In one embodiment the wound dressing absorbent layer is a gel-forming fibre impregnated or coated with a composition comprising a chelating agent, an amphoteric surfactant, and an anionic surfactant.

In one embodiment the wound dressing absorbent layer is a gel-forming fibre impregnated or coated with a composition comprising a chelating agent, an amphoteric surfactant, an anionic surfactant and a nonionic surfactant.

In one embodiment the disclosed technology relates to the use of the wound dressing for the treatment of a wound, wherein the wound contains biofilm.

In one embodiment the disclosed technology relates to the use of the wound dressing to remove slough, necrosis or other foreign matter from a wound.

In one embodiment the disclosed technology relates to the use of the wound dressing to prevent or minimise slough accumulation in a wound, by contacting the wound dressing disclosed herein with a wound.

In one embodiment the disclosed technology relates to a method or preventing or minimising slough accumulation in a wound, by contacting the wound dressing disclosed herein with a wound. In one embodiment the wound dressing does not provide a chemically-induced microbicidal effect.

In another embodiment the disclosed technology relates to a composition comprising a chelating agent, an amphoteric surfactant, and an anionic surfactant for use in the treatment of a wound, such as a chronic wound, acute wound, burn, a wound comprising a bacterial biofilm or a wound comprising slough. The composition may be as described hereinabove for any other embodiment of the invention.

DETAILED DESCRIPTION OF THE DISCLOSURE

As used herein the expression "wound" may include an injury to living tissue and may be caused by a cut, blow, or other impact, abrasion, pressure, heat or chemical; typically, one in which the skin is cut or broken. A wound may often be described as chronic or acute. Acute wounds may occur as a result of surgery or trauma. Typically, when not too severe and where the victim is otherwise in good health, wounds progress through well-defined stages of healing within a predicted timeframe. Chronic wounds begin as acute wounds. An acute wound can become a chronic wound when it does not follow the normal healing pathway resulting in a lengthened recovery. It is believed that the transition from acute to chronic wound can be due to an inadequate immune response for example: the patient being immunocompromised, the wound being insufficiently perfused or being highly contaminated.

Chronic wounds may include for example: venous ulcers (such as those that occur in the legs due to venous insufficiency), which account for the majority of chronic wounds and mostly affect the elderly; diabetic ulcers (for example, foot or ankle ulcers); arterial ulcers (due to peripheral arterial disease); and pressure injuries due to immobility.

Wounds may also include a deep tissue injury. Deep tissue injury is a term proposed by the National Pressure Ulcer Advisory Panel (NPUAP) to describe a unique form of pressure ulcers. These ulcers have been described by clinicians for many years with terms such as purple pressure ulcers, ulcers that are likely to deteriorate and bruises on bony prominences.

The disclosed technology relates to the subject matter as defined above.

The term "slough" is known to the skilled person and may be defined as a layer or mass of dead tissue separated from surrounding living tissue, or tissue that is adhered to a wound but capable of being removed as in a wound, sore, or inflammation.

Wound Dressing

The wound dressing disclosed herein may have a thickness between 0.5 to 20, or 2 to 10, or 3 to 7 mm.

In one embodiment the wound dressing may be buffered to have a pH of 4-10, or 5-8, or 5.5-6.5.

The wound dressing may be comprised of one or more layers selected from the group comprising an outer cover layer, an absorbent layer, a gel-forming fibre, an adhesive layer, a wound contact layer, a distribution layer, and combinations thereof.

In some embodiments, a wound dressing includes one or more absorbent layer(s). The absorbent layer may be a foam or a structure derived from a superabsorbent polymeric material. If foam is used, the foam may also act as a distribution layer.

In some embodiments the wound dressing comprises an outer cover layer and one or more absorbent layer(s) in combination with a gel-forming fibre. The gel-forming fibre typically is in direct contact with the wound, and thus no additional wound contact layer is required.

By gel forming fibres is meant hygroscopic fibres which upon the uptake of wound exudate become moist slippery or gelatinous. The gel forming fibres can be of the type which retain their structural integrity on absorption of exudate or can be of the type which lose their fibrous form and become an amorphous or structureless gel. The gel forming fibres are typically sodium carboxymethylcellulose fibres, chemically modified cellulosic fibres, alkyl sulphonate modified cellulosic fibres such as those described in WO2012/061225, pectin fibres, alginate fibres, chitosan fibres, hyaluronic acid fibres, or other polysaccharide fibres or fibres derived from gums, as well as non-cellulose synthetic fibres such as poly(vinyl alcohol) and polyacrylate.

In one embodiment the gel forming fibres may be chemically modified carboxymethylcellulose fibres, typically sodium carboxymethylcellulose fibres. In one particular embodiment the absorbent layer is the gel-forming fibres, and the dressing does not contain additional dressing layers.

The gel forming fibres are typically chemically modified cellulosic fibres in the form of a fabric and in particular carboxymethylated cellulose fibres as described in PCT WO00/01425. Sodium carboxymethylcellulose fibres typically have a degree of substitution of at least 0.05 carboxymethyl groups per glucose unit. The gel forming fibres typically have an absorbency of at least 2 grams (or at least 8 grams, or at least 10 grams), 0.9% saline solution per gram of fibre (as measured by BS EN 13726-1 (2002) "Test methods for primary wound dressings", section 3.2 "Free swell absorptive capacity"). The carboxymethylated cellulosic fabrics typically have a degree of substitution between 0.12 to 0.35 (as defined in WO00/01425) more typically a degree of substitution of between 0.20 and 0.30 such that the absorbency of a fabric produced from is increased when compared to the unmodified cellulose. Particular useful fabrics have an absorbency of between 10 g/g of to 30 g/g of isotonic aqueous solution as measured by the method described in BS EN 13726-1 (2002).

The cellulosic fabric typically consists solely of cellulosic fibre but may contain a proportion of a textile fibre or gel forming fibre. This textile fibre may be for example a cellulose fibre of a known kind and may comprise continuous filament yarn and/or staple fibre.

The absorbent layer can be in direct contact with the wound, or comprise a wound contact layer, positioned between the wound and the absorbent layer. The wound contact layer is capable of absorbing exudate from the wound and transmitting it to the absorbent layer.

The wound contact layer in one embodiment comprises gel-forming fibres, or a silicone gel.

The outer cover layer of the dressing is a bacterial and viral barrier layer which typically resists the ingress of liquid but allows moisture vapour transmission.

In one embodiment the absorbent layer may be a superabsorbent. The superabsorbent may be a fibrous polymer, or a nonwoven material.

The superabsorbent may be a polyacrylate or starch polymer.

In one embodiment the absorbent layer may be a foam. The foam may have an open cell and/or closed cell structure.

The foam may be derived from polyurethane, polyvinyl alcohol, a collagen, a chitosan. Typically, the foam may be a polyurethane foam.

The wound dressing disclosed herein may be prepared by a process comprising applying to the absorbent layer a composition comprising a chelating agent, an amphoteric surfactant as disclosed herein.

Inclusion of the disclosed technology in a wound dressing or similar wound treatment device (for instance a debridement tool) can be achieved by addition to the material from which the device is constructed or by addition to the finished device.

For example, where a component part or all of the device is constructed from fibres the technology may be:
  added to the dope (the liquid from which the fibres are spun [extruded])
  co-extruded in a hot melt process
  washed into the fibre by a soaking process coated onto the formed fibre by passing through a bath containing the technology in a liquid or solution form {where the solute may be removed by a drying process (known in the art—such as by forced air (or any other gas-particularly nitrogen if flammable solvents are involved; or by heat; or by heat and forced air)} or as a molten liquid
  sprayed onto the formed fibre in a liquid form or from a solution {where the solute may be removed by a drying process (known in the art—such as by forced air (or any other gas—particularly nitrogen if flammable solvents are involved; or by heat; or by heat and forced air)} or as a molten liquid in a hot-melt inkjet process
  added as a powder coating where adhesion could be encouraged by electrostatic effects or by increasing the adhesive tack properties of the receiving fibre (say by partial hydration using humidity or by pre-treating the fibre with a viscous liquid such as an alcohol (for example hexanol), a polyol (for example propan-1,2-diol or glycerol), a hydrophilic hydrocarbon (for example a poly(ethylene oxide)) or by the order of addition of the invention itself (for example a liquid surfactant such as liquid fatty acid or fatty acid salt or a liquid fatty acid that will form the salt in situ).
  Or, where the device is preformed, for example as a fabric or a foam, the technology may be added via similar washing, coating, spraying or powder coating.
  Additionally, the technology may be added by suspending the technology in a non-solvent and passing this through the device such that the suspended technology is mechanically trapped (i.e. positively added by filtration of the technology);
  or added as an ink or pigment by a printing process, for example a screen-printing process, where the addition can be closely controlled by use of the screen. The print could be a continuous, for example as achieved by flood-coating, or, more preferably as a discontinuous coating (regular or random patterned) as it has less impact on the devices porosity/breathability, flexibility and ability to contour to the complex topography of the wound bed and both the macroscopic (physiology) and microscopic (cellular) levels.
  added as a separate layer:
  for example, as a gel coating directly onto the wound device by, for example, a knife-over-roll or gravure coating technique or cast as a film by a similar coating technique and then adhered to the wound device by tackifying the device or the film by, for example humidification, or by the addition of an adhesive.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

Example 1

The following examples are prepared and evaluated using a simulated wound matrix composition. A wound matrix is prepared to contain:

| Component | Formulation |
| --- | --- |
| Water | 44.338% w/w |
| Sodium alginate | 1.75% w/w |
| Xanthan Gum | 25.2% w/w |
| Microcrystalline Cellulose | 0.3% w/w |
| Electrolytes and divalent metal ions | Calcium chloride (1.5% w/w) |
| Hydrolysed Collagen | 1% w/w |
| Hydrolysed Keratin | 1% w/w |
| Gelatin type A | 0.5% w/w |
| Human Plasma | 3% w/w |
| Deactivated yeast cells | 20% w/w |
| Crystal Violet Stain | 0.26% w/w solution used at 2.5% w/w of final formulation |
| Sodium propylparaben | 0.112% w/w |
| Sodium hydroxide | 0.3% w/w |

The simulated wound matrix is crosslinked with 1.5% w/w calcium chloride for 18 hours onto a solid phase screening system (96-peg microtiter plate lid). The pegs are dipped into the simulated wound matrix and immediately transferred to a calcium chloride bath to achieve crosslinking. Solutions of test materials are prepared at 1% w/w in a 96 well microtiter plate. Following crosslinking, the pegs are inserted into the wells and incubated at 37° C. for 1 hour. Efficacy is characterised by the change in colour of the test solutions resulting from disruption of the stained material and is quantified by reading the absorbance of each solution at 595 nm. Results are presented with respect to a 1% w/w benzethonium chloride aqueous solution. Benzethonium chloride being a Comparative Example and disclosed in s WO2012/136968 as part of the invention disclosed therein.

| 1% w/w Surfactants | | |
| --- | --- | --- |
| Compound | Class | % Difference in Efficacy | HLB Value[†] |
| Benzalkonium Chloride | Cationic | +60 | N/A |
| Di-sodium Lauryl Sulfosuccinate | Anionic | +844 | N/A |
| Sodium Laureth-2 Sulphate | Anionic | −30 | 15.3 |
| Sodium Dodecyl Sulphate | Anionic | −99 | 33.0 |
| Sodium Oleate | Anionic | +996 | 10.55 |
| Cocoamidopropyl betaine | Amphoteric | +120 | N/A |
| Poloxamer 188 | Nonionic | −90 | 3.4 |

-continued

| 1% w/w Chelators | | |
|---|---|---|
| Compound | % Difference in Efficacy | Solubility of Calcium Salt (mg/ml) |
| Tris-odium Citrate | +1750 | 0.23 (pH 7.5) |
| Potassium Oxalate | +1350 | <0.005 (pH 7.5) |
| Sodium Di-hydrogen Phosphate | −70 | 0.63 (pH 4.5) |
| Citric Acid | +50 | 17 (pH 2.0) |

†AKZO Nobel published values using modified Davies HLB group numbers (Cosmetic Emulsions, Elżbieta Sikora, ISBN/ISSN: 978-83-65991-50-8)
‡ Determination of calcium salt solubility with changes in pH and $pCO_2$, simulating varying gastrointestinal environments. Goss SL et al. Journal of Pharmacy and Pharmacology 59; 11; 1485-1492.

Comparisons are also made to a composition containing 0.39% w/w di-sodium EDTA and 0.135% w/w benzethonium chloride, based on the formula of a commercially available product (AQUACEL® Ag+ Extra)). This composition is 30% less effective than the Comparative example outlined above with 1% benzethonium chloride.

Interpretation of Results

HLB value is predictive of the efficacy of detergency of certain surfactants and would typically be used to guide selection, the higher the HLB value the greater the predicted detergency. The ability of the surfactants (with published HLB values) at 1% w/w to disrupt the simulated test wound matrix does not correlate as might be expected. Sodium lauryl sulphate (SLS) is regularly used as a bench mark for high detergency but is also regarded as being too harsh for routine use in personal care products. Di-sodium lauryl sulfosuccinate is regarded as a milder alternative to SLS. Sodium oleate, the basis for traditional bar-soap, is also generally accepted as being an inferior cleaning agent to SLS, yet both sodium oleate and di-sodium lauryl sulfosuccinate have efficacies an order of magnitude greater than SLS in disrupting the simulated test wound matrix. Similarly, sodium oleate and di-sodium lauryl sulfosuccinate have efficacies an order of magnitude greater than benzalkonium chloride, cocoamidopropyl betaine and Poloxamer™ 188 all of which are commonly used in liquid wound cleansing products. Thus, demonstrating the choice of surfactant cannot be predicted by expected detergency or by selecting components in common use.

The simulated test wound matrix is cross-linked and fixed onto the test surface by treatment with calcium chloride. It may therefore seem obvious that this fixation could be reversed by application of a compound that can compete for calcium and remove it, for example by precipitation as a poorly soluble salt. It would seem reasonable to assume that lack of solubility of a calcium chelating agent could be used as a predictor of the ability of that agent to remove calcium from the matrix and therefore be of higher matrix disruptive potential. Calcium citrate (at pH 7.5) is significantly more soluble than calcium oxalate at the same pH, yet citrate shows greater efficacy in the simulated test wound matrix than an equivalent w/w of oxalate. Furthermore, although reducing the pH of the citrate system to that of citric acid does both increase solubility of the calcium salt and decrease matrix disruption as predicted, it is still more effective than the higher pH sodium di-hydrogen phosphate which has a less soluble calcium salt. Thus, selecting a chelant cannot be predicted by calcium salt solubility or by pH effect.

Example 2

The combined effect of surfactants and chelants is investigated when presented as a coating on a wound dressing that gels in the presence of water [AQUACEL® Extra, ConvaTec PLC]. Dressings without surfactant or chelator are used as controls.

The test model from Example 1 is adapted to accommodate solid test materials. To achieve this the simulated wound matrix is cast onto cellulose acetate sheets using a thin film applicator (1.5 mm wet thickness) and submerged face-down into 1.5% w/w calcium chloride for 24 hours. Test dressings are cut to 2 $cm^2$, hydrated with 1 ml Test Solution A (BS EN 13726-1:2002), placed onto the substrate and incubated 37° C. for 18 hours. Efficacy is characterised by the change in colour of the dressings resulting from absorption of liquified test matrix containing crystal violet dye. The solubilised fraction is quantified by extraction of the crystal violet stain from the dressings by adding 2 ml of 33% v/v acetic acid and extracting for 30 minutes on a roller mixer. The absorbance of each resultant solution is read at 595 nm.

Results on a % w/w basis:

| Experiment | Surfactant | Chelator | Increase in Efficacy % |
|---|---|---|---|
| 2A | 0.5% w/w sodium oleate | 0.25% w/w tetra-sodium EDTA | 275 |
| 2B | 0.5% w/w sodium oleate | 0.5% w/w tetra-sodium EDTA | 244 |
| 2C | 1.0% w/w sodium oleate | 0.5% w/w tetra-sodium EDTA | 264 |

Results on a weight per unit area basis:

| Experiment | Surfactant | Chelator | Increase in Efficacy % |
|---|---|---|---|
| 2A | 0.75 $g/m^2$ sodium oleate | 0.375 $g/m^2$ tetra-sodium EDTA | 275 |
| 2B | 0.75 $g/m^2$ sodium oleate | 0.75 $g/m^2$ tetra-sodium EDTA | 244 |
| 2C | 1.5 $g/m^2$ sodium oleate | 0.75 $g/m^2$ tetra-sodium EDTA | 264 |

Interpretation of Results

Test substances are described as a weight percentage of the dry dressing. As the dressings in the example absorb high volumes of aqueous liquids (approximately 23 g/g in this instance) and the function of the test substances is facilitated by moisture, due consideration must be given to dilution effects. 1.0% w/w in this example approximates to a 0.043% solution if tested as in Example 1. Therefore, much reduced effects might be anticipated. However, significant improvement is achieved over both the control and the cationic surfactant/chelator comparators.

No improvement in performance is observed for the individual or combined increase in concentration of the test substances.

Example 3

As with any medical treatment, patient safety is paramount and where skin is broken there is always a risk that components may remove essential lipids from tissue, absorbed into local tissue or the circulatory systems of the blood and lymph. To reduce risk, it is advisable to select the safest candidate and to minimise exposure to any soluble or absorbable substance and this is most readily achieved by minimising the amount and/or concentration applied. Because of their comparatively high detergency, anionic surfactants are considered harsh whereas amphoteric surfactants are generally less effective but have better skin compatibility. Therefore, three added component systems on gelling dressings are investigated consisting of a chelator and two surfactants. The test is as described in Example 2.

Results on a % w/w basis:

| Experiment | Sodium Oleate/ % w/w | Sodium Cocoamphoacetate/ % w/w | Tetra-sodium EDTA/ % w/w | Increase in Efficacy/ % |
|---|---|---|---|---|
| 3A | 0.55 | 0.2625 | 0.30 | 57 |
| 3B | 1.00 | 0.025 | 0.50 | 81 |
| 3C | 0.10 | 0.50 | 0.10 | 73 |
| 3D | 0.50 | 0.0625 | 0.25 | 177 |

Results on a weight per unit area basis:

| Experiment | Sodium Oleate/ $g/m^2$ | Sodium Cocoamphoacetate/ $g/m^2$ | Tetra-sodium EDTA/ $g/m^2$ | Increase in Efficacy/ % |
|---|---|---|---|---|
| 3A | 0.825 | 0.394 | 0.45 | 57 |
| 3B | 1.5 | 0.0375 | 0.75 | 81 |
| 3C | 0.15 | 0.75 | 0.15 | 73 |
| 3D | 0.75 | 0.0938 | 0.375 | 177 |

Interpretation of Results

No linear relationships between component concentration and activity could be identified with the addition of the amphoteric surfactant (sodium cocoamphoacetate) seemingly reducing activity (comparing example 3B to 2C). However synergistic combinations are found (example 3D) where an addition of the amphoteric surfactant enabled significant reductions in both the anionic surfactant and chelator whilst still achieving a significant improvement in performance over the base dressing.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

In this specification, the use of the singular includes the plural unless the context clearly dictates otherwise. In this application, the use of "or" means "and/or" unless stated otherwise. Furthermore, use of the term "including" as well as other forms, such as "include", "includes," and "included," is not limiting.

Unless defined otherwise, all technical and scientific terms used in this specification have the same meaning as is commonly understood by the reader skilled in the art to which the claimed subject matter belongs. It is to be understood that the foregoing summary of the disclosure and the following examples are exemplary and explanatory only and are not restrictive of any subject matter claimed.

Each of the documents referred to above is incorporated herein by reference. Except in Examples, or where otherwise explicitly indicated, all numerical quantities in this description specifying amounts of materials, device dimension, and the like, are to be understood as modified by the word "about."

Unless otherwise indicated, each chemical or composition referred to herein should be interpreted as being a commercial grade material which may contain the isomers, by-products, derivatives, and other such materials which are normally understood to be present in the commercial grade.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about".

As used herein, the expression "consisting essentially of" permits the inclusion of substances that do not materially affect the basic and novel characteristics of the composition under consideration.

It is to be understood that at least some of the figures and descriptions of the disclosure have been simplified to focus on elements that are relevant for a clear understanding of the disclosure, while eliminating, for purposes of clarity, other elements that the reader skilled in the art will appreciate may also be required. Because such elements are well known to the reader skilled in the art, and because they do not necessarily facilitate a better understanding of the disclosure, a description of such elements is not provided herein.

The invention claimed is:

1. A wound dressing or debridement tool comprising an absorbent layer impregnated or coated with a composition comprising
   a chelating agent present at 0.01 to 1 wt. % and comprises a salt of ethylenediaminetetra-acetic acid (EDTA),
   an amphoteric surfactant present at 0.01 to 1.5 wt. % and comprises sodium cocoamphoacetate, and
   an anionic surfactant present at 0.05 to 1.5 wt. % and comprises sodium oleate.

2. The wound dressing or debridement tool of claim 1, wherein the anionic surfactant is present at 0.1 to 1 wt % or 0.1 to 0.5 wt %.

3. The wound dressing or debridement tool of claim 1, wherein the anionic surfactant further comprises an anionic surfactant chosen from a fatty acid or fatty acid salt, a sulphate, a sulphosuccinate, a sarcosine, a sarcosinate, an isethionate, a glutamate, or a taurate.

4. The wound dressing or debridement tool of claim 1, wherein the amphoteric surfactant is present at 0.02 to 0.8 wt % or 0.05 to 0.5 wt %.

5. The wound dressing or debridement tool of claim 1, wherein the amphoteric surfactant further comprises an amphoteric surfactant chosen from an hydrocarbyl-amphoacetate, alkenyl-amphoacetate, hydrocarbyl-amphodiacetate, alkenyl-amphodiacetate, hydrocarbylampho-propionate, hydrocarbylampho-dipropionate, or hydrocarbylamphohydroxypropyl sultaine, wherein the hydrocarbyl and alkenyl groups contain 6 to 24, or 8 to 24 carbon atoms.

6. The wound dressing or debridement tool of claim 1, wherein the chelating agent is present at 0.1 to 0.75 wt % or 0.1 to 0.5 wt %.

7. The wound dressing or debridement tool of claim 1, wherein the chelating agent further comprises a chelating agent chosen from a hydroxy-carboxylic acid ester or amide acid, or salts thereof, an oxalate, or a phosphate.

8. The wound dressing or debridement tool of claim 1, wherein the composition is impregnated or coated in the wound dressing and comprises:
the chelating agent is present at 0.1 to 0.75 wt %,
the anionic surfactant is present at or 0.1 to 1 wt %, or
the amphoteric surfactant is present at or 0.02 to 0.8 wt %.

9. The wound dressing or debridement tool of claim 1, wherein the composition is impregnated or coated in the wound dressing and comprises:
the chelating agent is present at 0.1 to 0.5 wt %,
the anionic surfactant is present at 0.1 to 0.5 wt %
the amphoteric surfactant is present at or 0.05 to 0.5 wt %.

10. The wound dressing or debridement tool of claim 1, wherein the composition impregnated or coated in the wound dressing or debridement tool comprises:
the chelating agent is present at 0.1 to 0.5 wt % (or 0.15 to 1.5 $gm^{-2}$),
the anionic surfactant is present at 0.1 to 0.5 wt % (or 0.15 to 1.5 $gm^{-2}$), and
the amphoteric surfactant is present at or 0.05 to 0.4 wt % (or 0.075 to 0.6 $gm^{-2}$).

11. The wound dressing or debridement tool of claim 1, wherein the composition impregnated or coated in the wound dressing or debridement tool further comprises:
an amphoteric surfactant chosen from an hydrocarbyl-amphoacetate, alkenyl-amphoacetate, hydrocarbyl-amphoacetate, alkenyl-amphoacetate, hydrocarbylampho-propionate, hydrocarbylampho-dipropionate, or hydrocarbylamphohydroxypropyl sultaine, wherein the hydrocarbyl groups contain 6 to 24, or 8 to 24 carbon atoms;
an anionic surfactant chosen from a fatty acid or fatty acid salt, sulphate, a sulphosuccinate, a sarcosine, a sarcosinate, an isethionate, taurate, and a glutamate; and
a chelating agent chosen from a hydroxy-carboxylic acid ester or amide acid, or salts thereof (for example a citrate, tartrate, tartramide, or tartrimide, gluconic acid, a gluconate, a lactate, lactic acid, glycolic acid, or glycolate), an oxalate, or a phosphate.

12. The wound dressing or debridement tool of claim 1, wherein the composition impregnated or coated in the wound dressing further comprises:
an amphoteric surfactant chosen from an hydrocarbyl-amphoacetate, alkenyl-amphoacetate, hydrocarbyl-amphoacetate, alkenyl-amphoacetate, hydrocarbylampho-propionate, hydrocarbylampho-dipropionate, or hydrocarbylamphohydroxypropyl sultaine, wherein the hydrocarbyl groups contain 6 to 24, or 8 to 24 carbon atoms;
an anionic surfactant chosen from a fatty acid or fatty acid salt, a glutamate, a sulphosuccinate, a sarcosine, or a sarcosinate; and
a chelating agent chosen from an oxalate, a citrate, or a phosphate.

13. The wound dressing or debridement tool of claim 1, wherein the composition impregnated or coated in the wound dressing further comprises: a nonionic surfactant.

14. The wound dressing of claim 13, wherein the nonionic surfactant is present at 0.01 to 0.7 wt % (or 0.015 to 1.05 $gm^{-2}$), or 0.05 to 0.5 wt % (or 0.075 to 0.75 $gm^{-2}$), or 0.1 to 0.3 wt % (or 0.15 to 0.45 $gm^{-2}$).

15. The wound dressing or debridement tool of claim 1, wherein the composition impregnated or coated in the wound dressing or debridement tool comprises:
the chelating agent is present at 0.01 to 1 wt % (or 0.015 to 1.5 $gm^{-2}$),
the anionic surfactant is present at 0.05 to 1.5 wt % (or 0.075 to 2.25 $gm^{-2}$),
the amphoteric surfactant is present at 0.01 to 1.5 wt % (or 0.015 to 2.25 $gm^{-2}$), and
the nonionic surfactant is present at 0.01 to 0.7 wt % (or 0.015 to 1.05 $gm^{-2}$).

16. The wound dressing or debridement tool of claim 13, wherein the nonionic surfactant is chosen from polyoxyethylene fatty acid esters, polyoxyethylene glycol fatty acid esters, sucrose fatty acid esters, poly-oxyethylene hydrogen carbonate castor oils, and polyoxyethylene alkyl ethers.

17. The wound dressing or debridement tool of claim 1, wherein the absorbent layer impregnated or coated with the composition comprises at least one layer composed of a foam, absorbent, or a gel-forming fibre.

18. The wound dressing or debridement tool of claim 1, wherein the wound dressing absorbent layer is a gel-forming fibre.

19. The wound dressing or debridement tool of claim 1, wherein the wound dressing absorbent layer is a gel-forming fibre, and wherein the fibre is chemically modified carboxymethylcellulose fibres.

20. A composition comprising a chelating agent present at 0.01 to 1 wt. % and comprises a salt of ethylenediaminetetraacetic acid (EDTA), an amphoteric surfactant present at 0.01 to 1.5 wt. % and comprises sodium cocoamphoacetate, and an anionic surfactant present at 0.05 to 1.5 wt. % and comprises sodium oleate for use in the treatment of a wound selected from the group consisting of a chronic wound, acute wound, burn, a wound comprising a bacterial biofilm, and a wound comprising slough.

* * * * *